Jan. 10, 1928.

H. A. FOOTHORAP 1,655,415

WORK SHEET LOCATING MEANS

Filed April 6. 1926 4 Sheets-Sheet 1

Inventor

Harry A. Foothorap,

By L. G. Juleher

Attorney

Jan. 10, 1928.

H. A. FOOTHORAP 1,655,415

WORK SHEET LOCATING MEANS

Filed April 6, 1926   4 Sheets-Sheet 2

Inventor
Harry A. Foothorap.

By L. G. Juliher
Attorney

Jan. 10, 1928. 1,655,415
H. A. FOOTHORAP
WORK SHEET LOCATING MEANS
Filed April 6, 1926  4 Sheets-Sheet 3
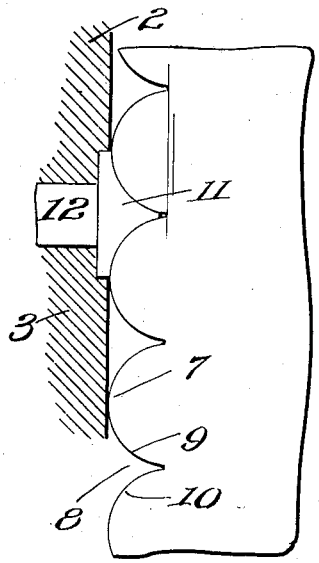
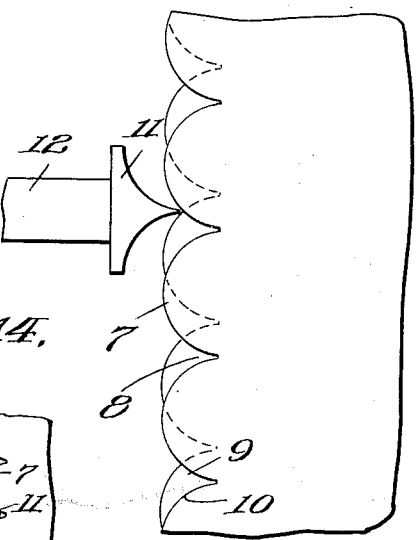
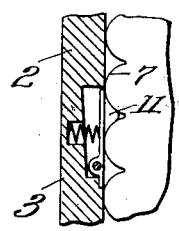
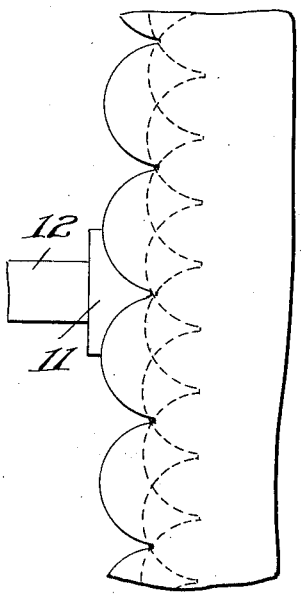
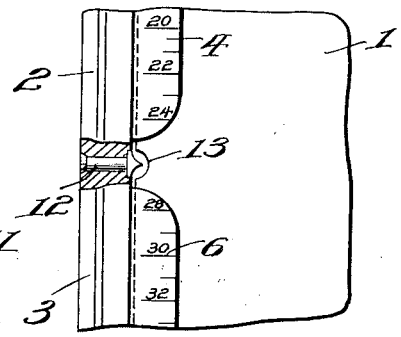
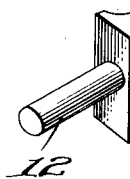
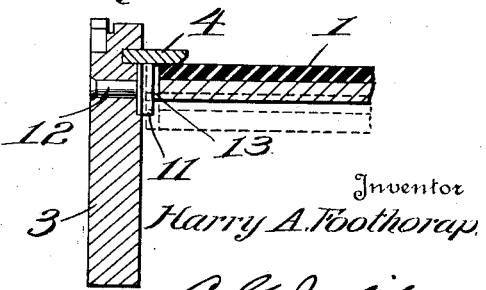
Inventor
Harry A. Foothorap
By
Attorney

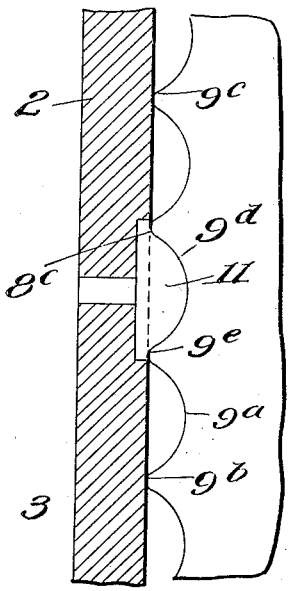
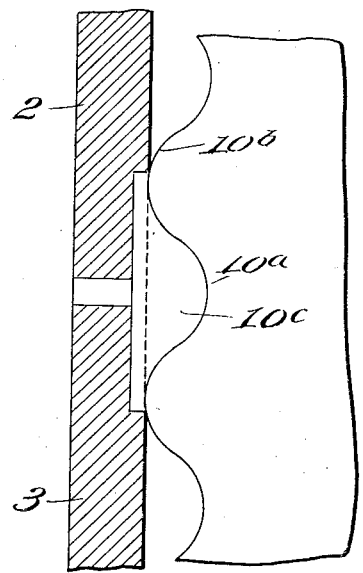
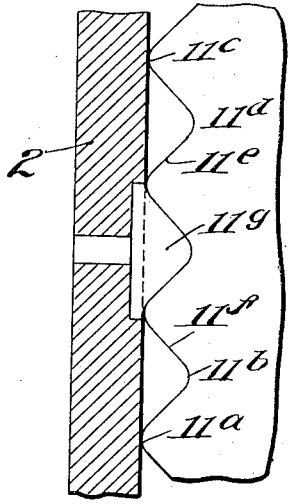
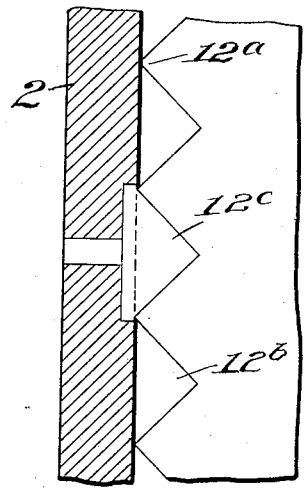
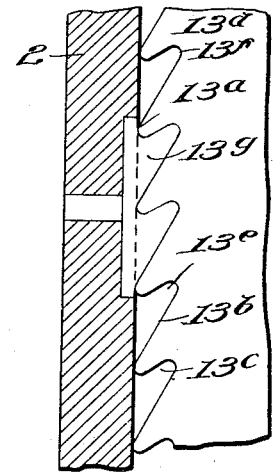

Patented Jan. 10, 1928.

1,655,415

UNITED STATES PATENT OFFICE.

HARRY A. FOOTHORAP, OF HARRISBURG, PENNSYLVANIA, ASSIGNOR TO ELLIOTT-FISHER COMPANY, A CORPORATION OF DELAWARE.

WORK-SHEET-LOCATING MEANS.

Application filed April 6, 1926. Serial No. 100,095.

This invention relates to sheet locating means whereby a work sheet or a plurality of work sheets may be quickly and accurately located relative to a platen and to each other.

The object of the invention is to provide a sheet or form with locating means cooperating with a locator in a manner to permit the rapid manipulation of the form and its instant and accurate location in any one of a wide variety of predetermined positions as, for instance, the line positions of a typewritten or other spaced record.

Another object is to provide a series of forms with identical locating means arranged to coact with the same locator to accurately locate each of the sheets in its proper lined position throughout a wide range of relative positions of the sheets or forms.

A still further object is to form the sheet or sheets with locating means so designed that the sheet may be freely moved while in contact with the locator to the selected line position.

To the accomplishment of these objects and others as will hereinafter appear, several embodiments of the invention are illustrated in the accompanying drawings in which:

Figure 3 is a detail view showing one of the forms in engagement with the locator.

Figure 4 is a similar view of a portion of two forms and the locator and illustrating the manner in which these two sheets move in opposite directions in contact with the locator to seek a common line location.

Figure 5 is a similar view with one form located and the other two forms in contact with the locator and seeking location.

Figure 6 is a detail view of the locator.

Figure 7 is a view partly in section of a fragment of the platen and its frame showing the manner in which the locator is secured in the platen frame and disposed for cooperation with forms supported by the platen.

Figure 8 is a vertical section of the structure shown in Figure 7.

Figures 9, 10, 11, 12, 13 and 14 are views illustrating modified forms of my invention viewed in its broader aspects.

Figure 1:
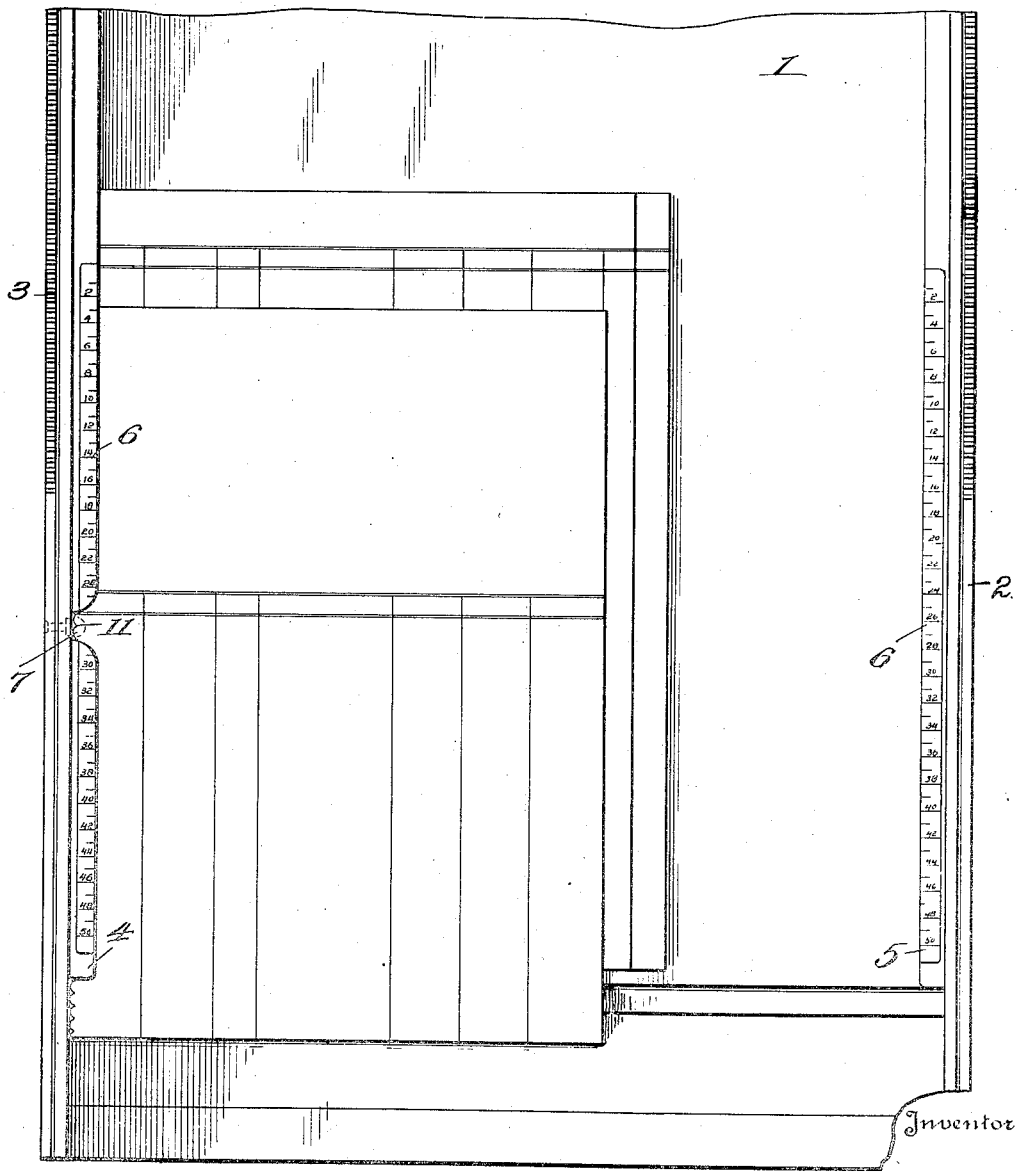
Figure 1 is a plan view of a portion of an Elliott-Fisher bookkeeping machine with the statement, customer's ledger and automatic audit sheet located thereon in accordance with my invention.
Figure 2:
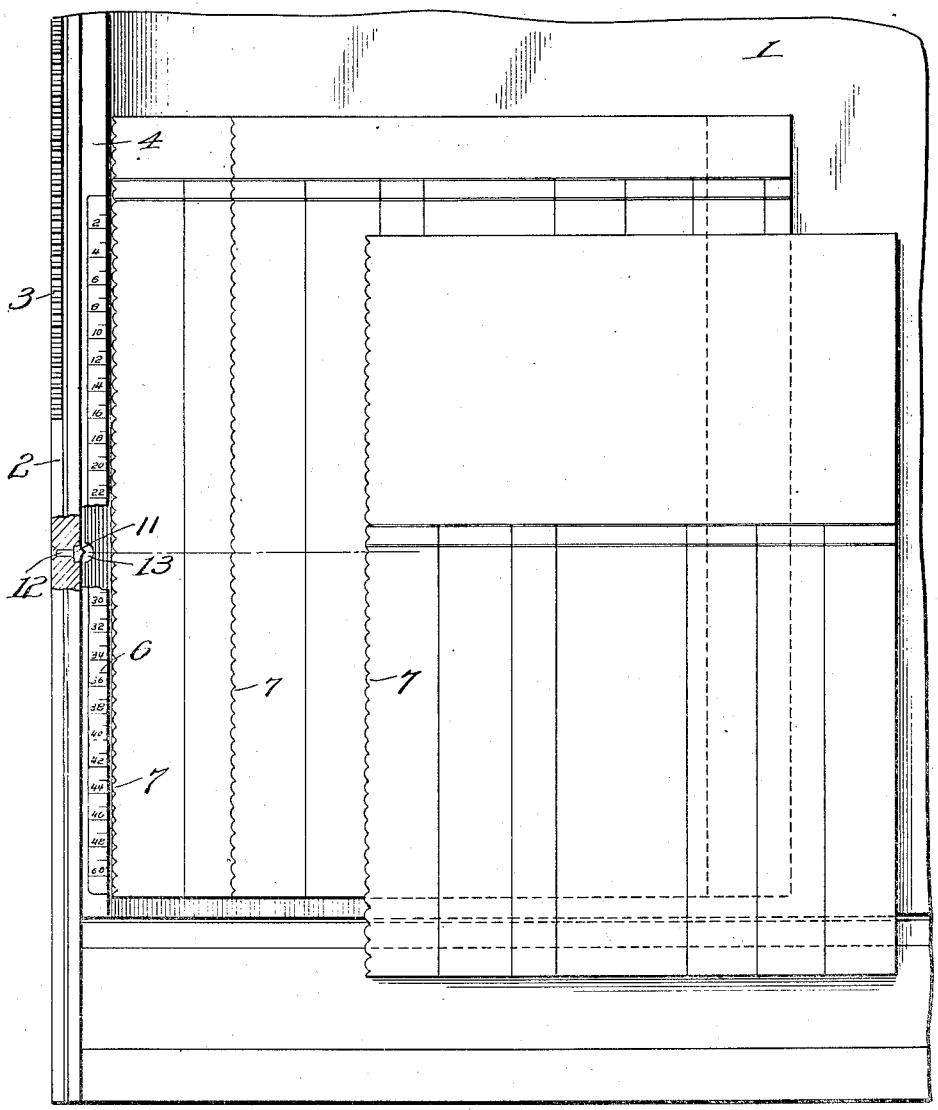
Figure 2 is a similar view with the forms withdrawn from the clamp to disclose their locating edges.

In the drawings 1 indicates the depressible flat platen of the well known Elliott-Fisher billing and bookkeeping machine of commerce. This platen is mounted in a stationary platen frame 2 having side members 3 constituting tracks or guides on which the printing or recording mechanism moves longitudinally of the platen to line space the lines of writing. The recording mechanism also travels transversely of the platen for letter spacing in a manner well understood.

Extending inwardly from the frame members 3 and disposed longitudinally thereof are stationary work clamps 4 and 5 on which are displayed line scales 6, the divisions of which correspond with the line positions or locations of the recording mechanism. The work sheets or forms are placed upon the platen while the latter occupies a slightly depressed position and are properly located longitudinally of the platen with the aid of the line scales. The platen is then elevated and the form or forms are securely clamped against one or both clamps and retained in proper position during the printing of the record.

The accurate line location of the forms ordinarily requires considerable skill and limits the speed of operation of the machine. The difficulty is naturally increased and additional time is consumed when the particular class of work being done entails the handling of a number of superposed forms which sometimes vary considerably in dimensions. A further element of difficulty is involved in certain billing and bookkeeping operations in which partial replacement of the forms is required and recollation of the forms necessitated as the work progresses. These difficulties will be readily recognized by those familiar with bookkeeping and condensed billing operations.

It becomes important, therefore, to provide form locating means which permit rapid collation of the forms in accurate line location.

In accordance with my invention this purpose may be accomplished by providing an edge of each form with a series of comparatively flat arcuate tabs or projections 7 defining intermediate outwardly flaring notches 8, the opposed walls 9 and 10 of which are oppositely curved. I find in practice that an entirely satisfactory construction is secured by cutting the projection 7 on a radius of .095 of an inch with .190 as the distance between centers and .09 as the depth of the notches. These dimensions result in projections slightly less than semicircular and satisfactorily resistant to any tendency to bend or break either in the ordinary handling of the form or when brought into contact with the locator 11 during the manipulation of the form on the platen.

The locator 11 is disposed vertically at the inner side of the left hand side member 3 of the platen frame as shown in Figure 7, being rigidly secured thereto by shank 12 and accommodated by a notch 13 in the platen. The forms remain in engagement with the locator regardless of the horizontal plane in which the platen may be located. This will be better understood by reference to Figure 8. The forms are placed on the depressed platen and properly line located by engagement with the locator 11. When the platen is elevated, the forms remain in engagement with the locator and are carried up and clamped against the clamp 4 by the platen. The transverse contour of that portion of the locator 11 which extends inwardly from the frame member 3 conforms to the adjacent contour of the form when the latter is in an accurate line location with the locator occupying one of the notches or interdental spaces 8. It will thus be seen that the locator proper has convergent side faces, the radii of which are substantially the same as the radii of the two adjacent tabs or projections 7 of the form and are struck from centers spaced by substantially the same interval as the centers from which two adjacent projections are struck. It follows from what has been said that when a form has been moved into complete engagement with the locator, the edge of the form will rest against and be properly lined up by the side member 3 of the frame which constitutes a work gage and guide as clearly indicated in Figure 3.

It will now be seen that a form placed on the platen may be moved longitudinally thereof in contact with the locator and with just sufficient lateral pressure to cause what may be said to be the automatic engagement of the form and locator with the latter fitted into one of the notches 8. This engagement will be complete in each line position reached by the form so that when the movement of a form has presented it in proper relation to another form or other forms engaged by the locator, said form will be likewise accurately located in the selected line position. The accuracy of this location is the invariable result of the engagement of the form with the locator and its contact with the side of the frame. The operator may then cause the elevation of the platen with assurance that all forms are in exact line registration.

It is obviously immaterial in what direction longitudinally of the platen the forms are moved in seeking a selected line location. As the engaging contours of the form and locator are exactly the same at opposite sides of the line, the form may be moved back and forth with equal facility and while in constant contact with the locator to a new line location.

In this back and forth movement of the form, it is obvious that the locator follows the contour of its locating edge and repeatedly opposes a yielding resistance to the movement of the form which is greatest in each line position of the form because the locator will be fully engaged in a notch. If, however, the line location reached is not the one desired, further pressure on the sheet will cause it to be cammed away from the locator to cause the disengagement of the latter from the notch and its subsequent engagement with a succeeding notch of the form. This is one of the distinguishing characteristics of this inventive concept. That is to say, it is believed to be new to provide locating means coacting with a form in such a manner that the form may be freely shifted to select a line or other location and will be repeatedly opposed by yielding resistance which will apprise the operator when the form reaches each position of true registration whether it be the particular one desired or not. Another underlying thought appears to be the provision of a camming action between a locator and a form. This camming action is apparent not only as the cause of the withdrawal of the locator from a notch in the form when the form is moved in a direction lengthwise of its notched edge, but it is also clearly apparent when we consider the manner in which a form or a plurality of forms are cammed into accurate line positions by a slight lateral pressure on the form in the direction of the locator when the form or forms are already in an approximate, but not accurate, line position.

By reference to Figure 4, it will be noted that two superposed forms are in approximate line position being slightly out of place in opposite directions. If now the right hand edges of these forms are lightly tapped in a manner usual in lining up sheets, the flared curve and generally inclined edges of the tabs or projections 7 will act as cams which by contact with the locator will cause the two forms to be cammed in opposite directions and into accurate registration.

In Figures 9 to 14, inclusive, I have shown modified forms of my invention. These forms are not specifically claimed herein, but appear to clearly fall within the scope of the invention in its broader aspect. In each, as in the form described, the edge of the sheet coacts with a locator to accurately locate the position of the sheet, but permits the sheet to be moved in a horizontal plane to the location selected.

In Figure 9 the notches 9ª in the edge of the form are of arcuate form forming intermediate projections 9ᵇ having arcuate ends 9ᶜ which are diminutive compared with the recesses and notches. The locator 11 in this instance is formed with a convex face 9ᵈ merging into concave portions 9ᵉ. The locator thus conforms to the shape of the adjacent edge of the form when the latter is lined up against the side member of the frame in accurate line location.

In Figure 10 the edge of the form is cut to define alternate convex and concave portions or projections and depressions 10ª and 10ᵇ, identical reversely disposed to move freely over and to be engaged and located by a locator 10ᶜ having a concavo-convex face conforming to the edge of the form when the latter is against the platen frame.

In Figure 11, the edge of the sheet is formed with identical projections and depressions 11ª and 11ᵇ, the former having curved ends 11ᶜ and the latter curved bottoms 11ᵈ with the sides of the projections formed by angularly related straight lines 11ᵉ and 11ᶠ. In other words, in Figure 11 the edge of the sheet is formed with identical saw teeth, the ends of which and the bottoms of the interdental spaces between which are rounded to facilitate the sliding or slipping of the form across a locator 11ᵍ, the face of which conforms to the adjacent contour of the form.

In Figure 12 a true saw tooth form is imparted to the edge of the sheet, the projections and notches 12ª and 12ᵇ being of triangular form and engaging a correspondingly formed locator 12ᶜ.

In Figure 13 the sheet is formed with inclined teeth or projections 13ª, the angular disposition of which produces a straight inclined runner 13ᵇ and a locking face 13ᶜ. The ends of the teeth are curved as shown at 13ᵈ and the bottoms of the notches 13ᵉ are preferably curved as shown at 13ᶠ. The locator 13ᵍ is shown formed with two teeth engaging two adjacent notches of the sheet though obviously a single tooth would be effective.

In the several forms of the inventions shown in the first twelve figures, it will be noted that the form may be moved past the locator in both directions with equal facility. With the arrangement shown in Figure 13, however, it is contemplated that the form will move only in one direction longitudinally of its notched edge when seeking the proper line location. When moved in this direction, the teeth or projections, which may be said to be of ratchet form, move freely past the locator. When the line position is reached, however, the form is drawn back slightly until stopped by the locator, the teeth of which not only arrest further movement of the form, but serve to lock it against lateral movement. This is for the reason that in order to move laterally the form must at the same time move longitudinally. Therefore, any slight lateral pull on the sheet or form will be resisted by the teeth of the locator.

In Figure 14, the locator shown in Figure 3 is yieldingly mounted and backed by a spring. This permits the necessary relative lateral movement of the sheet and locator to be secured by movement of the locator instead of the sheet.

Usually the form locating means are disposed at one side only of the platen, but it is obviously immaterial which side of the platen is utilized for this purpose or whether one or both sides of the platen and sheets are equipped with form locating means. In fact the location of different sheets of the same set or group at different sides of the platen is contemplated, but it is thought to be unnecessary to specifically illustrate and describe such obvious duplications and variations of arrangement of the locating means wherein the invention appears to reside.

I claim—

1. In combination, a locator, and a work sheet movable past the locator to different line positions by pressure exerted on the sheet and having at one edge a line of locator engaging notches determining such positions, the notches being of greater width than depth and having opposite edges diverging from a common point, to provide locating cams movable on the locator when such pressure is exerted on the sheet in the longitudinal direction of the line of notches to move the sheet to successive positions.

2. In combination, a locator, and a work sheet adapted to be moved past the locator to different line positions by pressure exerted on the sheet, said sheet having at one edge a line of substantially semi-circular tabs providing arcuate locating cams movable on the locator when such pressure is exerted on the sheet in the longitudinal direction of the line of tabs to move the sheet to successive positions and defining locator engaging notches for determining line positions of said sheet.

3. In combination, a locator, and a work sheet movable past the locator to different line positions by pressure exerted on the sheet, said sheet having at one edge a line of substantially semi-circular tabs providing arcuate locating cams movable on the locator when such pressure is exerted on the sheet in the longitudinal direction of the line of tabs to move the sheet to successive positions, and defining locator engaging notches for determining line positions of said sheet, said notches being of less depth than the radius of the tabs to thereby eliminate dead center resistance to such movement of the sheet.

4. In combination, a locator, and a work sheet movable past the locator to different line positions by pressure exerted on the sheet, and having at one edge a line of locator engaging tabs defining notches for determining different line positions of the sheet and provided respectively with a cam edge movable on the locator when such pressure is exerted on the sheet in the longitudinal direction of the line of tabs to move the sheet to successive positions, the general direction of said cam edges being at an angle of 45° or less relative to said edge of the sheet to facilitate movement thereof past the locator.

5. A work sheet having along one edge a series of tabs provided respectively with a cam edge, the general direction of which is at an angle of 45° or less relative to said edge of the sheet.

6. In combination, a depressible flat platen, a work sheet movable thereover to different line positions and having line locating notches along one side edge thereof, and a locator adjacent one edge of the platen for engaging a selected notch to locate the sheet and adapted for such engagement during depression and elevation of the platen.

7. In combination, a depressible flat platen, having a vertical recess in one side edge thereof, a work sheet having a line of locating notches along one side edge thereof, a locator projecting into said recess for engaging the notched edge of the sheet and adapted for such engagement when the platen is in either its depressed or elevated position.

In testimony whereof I have affixed my signature.

HARRY A. FOOTHORAP.